May 8, 1951  A. S. GRAHAM  2,551,940
ELEVATOR LEG BELT STOP
Filed Aug. 16, 1948
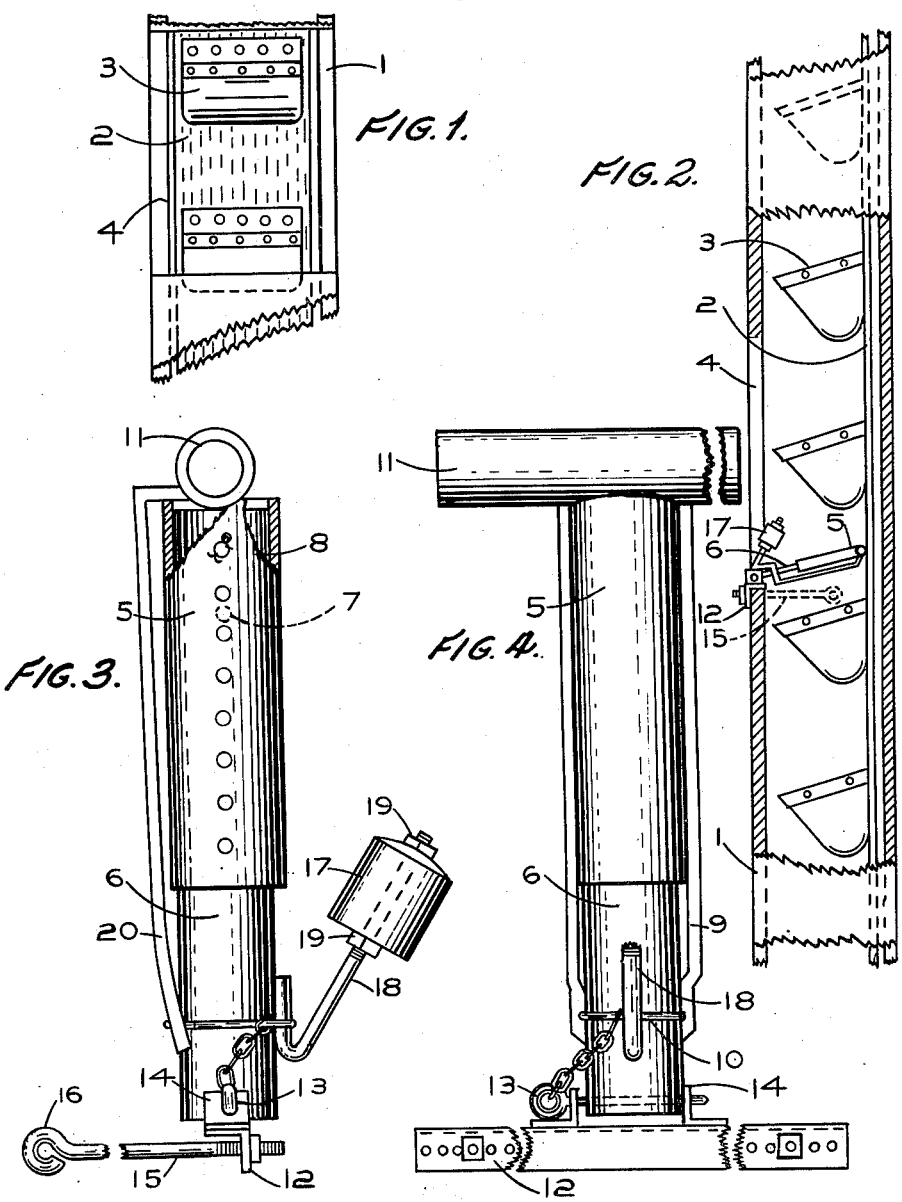
Inventor
Amos Hanley Graham
Per L. J. Mitchell
Attorney Patented May 8, 1951

2,551,940

UNITED STATES PATENT OFFICE 2,551,940

ELEVATOR LEG BELT STOP

Amos Stanley Graham, Webb, Saskatchewan, Canada

Application August 16, 1948, Serial No. 44,415
In Canada August 23, 1947

3 Claims. (Cl. 198—140)

My invention relates to belt stops more particularly having reference to a leg belt stop for grain elevators.

In the art to which the invention relates country elevators provide a leg for travel of a belt carrying buckets for elevating the grain. It frequently happens that the leg belt becomes plugged by over loading, drive belt breaking, or motor stalling, and the leg belt runs back and piles up a quantity of grain at the bottom when the clutch is released.

This results in damage to buckets and to the belt to prevent which the present device has been proposed. One of the objects of the invention is accordingly to provide an improved stop for leg belts in grain elevators that automatically operates to bind the belt against the back wall of the leg when the belt is released, and prevent the belt from running back.

A further object of the invention is to provide such a device adaptable to variations in size and construction of the leg and adjustable accordingly.

Other features and advantages of the invention will become apparent by reference to the accompanying description taken in conjunction with the drawings wherein like characters of reference indicate like parts throughout the several views and wherein:

Fig. 1 shows a fragment of a leg and belt viewed from the front at the inspection opening.

Fig. 2 is a side view of a section of leg and belt shown partly broken away to disclose the interior of the leg and with my belt stop installed and shown in belt engaging position.

Fig. 3 is a side view of the device taken by itself.

Fig. 4 is a front view of the device shown partly broken away.

Having reference to the drawings, 1 indicates the leg in which a belt 2 is mounted for travel, the belt carrying buckets 3 at intervals, this being common in the art. In the leg 1 is shown an inspection opening at 4 in which it is proposed to mount my leg belt stop.

The stop includes an arm formed of tubular sections 5 and 6 slidably engaging one within the other and adapted to be secured together by a pin 8 engageable in holes through the section 5 that are adapted for registry with a hole in the pipe 6 as indicated by the numeral 7. A metal strip 20 extends lengthwise along the one side and has a bend passing over the outer end of section 5. The strip 20 is secured at the other end by a wire 10 passing around the tubular section 6. This strip is for protection for the bucket to slide on as the bucket rises with the belt and to prevent the bucket from catching on the coupling 7 and lock nut 8.

On the upper end of the arm is a belt engaging member 11 of tubular formation and transversely carried by the arm section 5 fixed thereto. Reinforcement strips 9 are provided for the arm, on opposite sides, welded or otherwise secured to the tubular section 6 with the section 5 slidable therebetween.

The stop arm is mounted pivoted on an angle iron base 12 by a pin 13 engaging ears 14—14 spaced apart and secured on the base. For mounting the base in the inspection opening 4 of the leg 1 there are provided bolts 15—15, one for each end of the base 12 that secure the base on the lower edge of the inspection opening, the eye portions 16 of the bolts being secured to the side walls of the leg by bolts or other suitable means.

The leg arm carries a counterweight 17 threaded on a bent rod 18 that is fixed to the arm section 6, the counterweight being held in any desired position of adjustment by nuts 19.

Under normal operating conditions the pin 13 is removed and the arm assembly taken off and hung in a convenient place. When a plug up occurs the elevator leg belt stops. The operator takes the arm assembly and sets it in place pivoted on the pin 13. The assembly is then turned inward with the head 11 resting against the belt, unless a bucket intervenes, in which event it rests against the bucket and is adapted to gravitate against the belt when the bucket moves out of the way.

When the grain is cleared from the bottom of the leg the belt begins to run back. The arm with its head 11 resting against the belt wedges it against the back wall of the leg. When the belt starts running forward again the head 11 of the arm 5 releases the belt and the arm assembly may be turned back out of the leg and removed until required again.

While I have herein disclosed a preferred embodiment of my invention it is obvious that changes in the construction and arrangement of parts would be permissible and in so far as such changes come within the spirit and scope of the invention as defined by the appended claims they would be considered a part hereof.

What I claim and wish to secure by Letters Patent is:

1. A belt stop for the leg of grain elevators, the leg providing a casing and a belt mounted for travel therein, an inspection opening in the casing, and the stop comprising a bracket adapted for mounting on the lower edge portion of said opening, with means securing the bracket thereon, a belt stop arm, means pivoting said arm on the bracket, said arm being endwise adjustable to vary the length thereof, a stop member on the end of said arm, said arm being adapted to gravitate inward with the stop member contacting the belt above the level of the pivot of said arm, and a counterweight on the arm adapted to hold the arm against the belt.

2. A belt stop for the leg of grain elevators, said leg providing a casing with inspection opening, and said leg including a belt mounted for travel in the casing and buckets carried by the belt, the casing providing a back wall along which said belt passes, and said stop comprising a bracket with means for securing the bracket to the casing in the inspection opening, and a stop assembly unit with means pivotally mounting said unit on the bracket removable therefrom and adapted for gravitation inward against the belt, said unit including a belt engaging arm and a stop member on said arm adapted to press the belt against the casing back wall when the arm gravitates against said belt, said stop member comprising a tubular member transversely mounted on said arm.

3. A device as defined in claim 2 and including a plate on the under side of the belt engaging arm adapted for riding over buckets on the belt.

AMOS STANLEY GRAHAM.

REFERENCES CITED

The following references are of record in the file of this patent:

UNITED STATES PATENTS

| Number | Name | Date |
| --- | --- | --- |
| 567,683 | Marvel | Sept. 15, 1896 |
| 709,202 | Clarke | Sept. 16, 1902 |
| 723,400 | MacKenzie | Mar. 24, 1903 |
| 834,883 | Beach | Nov. 6, 1906 |
| 1,096,509 | Kern | May 12, 1914 |